(12) United States Patent
Moffat et al.

(10) Patent No.: US 11,952,448 B2
(45) Date of Patent: Apr. 9, 2024

(54) ORGANIC ADDITIVES AND COMPOSITIONS CONTAINING THE SAME

(71) Applicant: Xerox Corporation, Norwalk, CT (US)

(72) Inventors: Karen A. Moffat, Brantford (CA); Sepehr M. Tehrani, North York (CA); Kimberly D. Nosella, Ancaster (CA); Raysa Rodriguez Diaz, Burlington (CA); Richard P. N. Veregin, Mississauga (CA); Cuong Vong, Hamilton (CA)

(73) Assignee: Xerox Corporation, Norwalk, CT (US)

(*) Notice: Subject to any disclaimer, the term of this patent is extended or adjusted under 35 U.S.C. 154(b) by 9 days.

(21) Appl. No.: 17/386,054

(22) Filed: Jul. 27, 2021

(65) Prior Publication Data
US 2023/0046647 A1 Feb. 16, 2023

(51) Int. Cl.
| | |
|---|---|
| *C08F 220/28* | (2006.01) |
| *B33Y 70/10* | (2020.01) |
| *C08F 220/18* | (2006.01) |
| *C08F 224/00* | (2006.01) |
| *G03G 9/097* | (2006.01) |
| *C08F 20/26* | (2006.01) |
| *C08F 20/28* | (2006.01) |
| *C08F 24/00* | (2006.01) |

(52) U.S. Cl.
CPC ........... *C08F 220/282* (2020.02); *B33Y 70/10* (2020.01); *C08F 220/1806* (2020.02); *C08F 224/00* (2013.01); *G03G 9/09758* (2013.01); *C08F 20/26* (2013.01); *C08F 20/28* (2013.01); *C08F 24/00* (2013.01)

(58) Field of Classification Search
CPC .... C08F 224/00; C08F 220/282; C08F 24/00; C08F 20/26; C08F 20/28
See application file for complete search history.

(56) References Cited

U.S. PATENT DOCUMENTS

| | | | |
|---|---|---|---|
| 4,480,008 A * | 10/1984 | Farronato | C08G 18/8048 |
| | | | 427/195 |
| 4,923,919 A | 5/1990 | Frazee | |
| 5,461,103 A | 10/1995 | Bafford et al. | |
| 5,468,800 A | 11/1995 | Folsch et al. | |
| 6,020,416 A | 2/2000 | Mazur et al. | |
| 8,663,886 B2 | 3/2014 | Vanbesien et al. | |
| 8,728,455 B2 | 5/2014 | Konradi et al. | |
| 9,090,736 B2 | 7/2015 | Schwalm et al. | |
| 9,371,464 B2 | 6/2016 | Breton et al. | |
| 9,862,788 B2 | 1/2018 | Hilf et al. | |
| 10,358,557 B1 | 7/2019 | Veregin et al. | |
| 10,725,394 B1 | 7/2020 | Veregin et al. | |
| 2003/0029355 A1 | 2/2003 | Miyabayashi | |
| 2006/0038867 A1 | 2/2006 | Valentini | |
| 2007/0099814 A1 * | 5/2007 | Tamori | H01F 1/0054 |
| | | | 510/446 |
| 2008/0186373 A1 | 8/2008 | Rolly | |
| 2011/0312240 A1 * | 12/2011 | Amthor | C09D 133/066 |
| | | | 525/328.4 |
| 2011/0318551 A1 | 12/2011 | Nakagawa | |
| 2012/0177884 A1 | 7/2012 | Jones | |
| 2013/0289171 A1 | 10/2013 | Miller et al. | |
| 2016/0090495 A1 | 3/2016 | Suzuki | |
| 2016/0122597 A1 | 5/2016 | Xiao et al. | |
| 2018/0273696 A1 | 9/2018 | Goto et al. | |
| 2018/0273778 A1 | 9/2018 | Saito et al. | |
| 2019/0031638 A1 | 1/2019 | Beyer et al. | |
| 2019/0185687 A1 | 6/2019 | Bohling et al. | |
| 2019/0367753 A1 | 12/2019 | Chopra et al. | |
| 2020/0306830 A1 | 10/2020 | Veregin et al. | |
| 2020/0307027 A1 | 10/2020 | Veregin et al. | |
| 2020/0308328 A1 | 10/2020 | Veregin et al. | |
| 2020/0308330 A1 | 10/2020 | Veregin et al. | |
| 2020/0310268 A1 | 10/2020 | Veregin et al. | |
| 2022/0363920 A1 | 11/2022 | Veregin et al. | |
| 2023/0051056 A1 | 2/2023 | Moffat et al. | |
| 2023/0053177 A1 | 2/2023 | Tehrani | |
| 2023/0055456 A1 | 2/2023 | Tehrani et al. | |
| 2023/0073050 A1 | 3/2023 | Duquenne et al. | |
| 2023/0100354 A1 | 3/2023 | Moffat et al. | |

FOREIGN PATENT DOCUMENTS

| | | | | |
|---|---|---|---|---|
| CN | 107446457 A | * | 12/2017 | ........ C08F 283/008 |
| CN | 111087540 A | | 5/2020 | |
| CN | 111087540 A | * | 5/2020 | |

(Continued)

OTHER PUBLICATIONS

Extended European Search Report for EP 22183968 dated Nov. 29, 2022; pp. 1-9.
Mckenzie, Andrew, et al. "Core (polystyrene)-Shell [poly (glycerol monomethacrylate)] particles." ACS Applied Materials & Interfaces 9.8 (2017): 7577-7590.
Evonik launches Visiomer® Glyfoma, a low-odor reactive diluent—Evonik PDF press release, available from web as of Jul. 13, 2021 at https://methyl-methacrylate-monomers.evonik.com/en/evonik-launches-visiomer-glyfoma-a-low-odor-reactive-diluent-96754.html.

(Continued)

*Primary Examiner* — Ling Siu Choi
*Assistant Examiner* — David L Miller
(74) *Attorney, Agent, or Firm* — Bell & Manning, LLC

(57) ABSTRACT

Compositions are provided which may comprise a plurality of organic additive particles, the particles comprising a polymerization product of reactants comprising a dioxane/dioxolane monomer and a vinyl co-monomer, wherein the dioxane/dioxolane monomer is an ester of (meth)acrylic acid with an alcohol comprising a dioxane moiety, an ester of (meth)acrylic acid with an alcohol comprising a dioxolane moiety, or both. Toner and additive manufacturing compositions comprising the organic additive particles are also provided.

12 Claims, No Drawings

(56) References Cited

FOREIGN PATENT DOCUMENTS

| | | |
|---|---|---|
| EP | 1921509 A1 | 5/2002 |
| EP | 1609827 A1 | 12/2005 |
| EP | 1108758 B1 | 7/2006 |
| EP | 1834995 A1 | 9/2007 |
| EP | 2546313 | 1/2013 |
| EP | 2913186 A1 | 9/2015 |
| EP | 2823002 B1 | 5/2016 |
| EP | 1756237 B1 | 5/2017 |
| EP | 3360907 | 8/2018 |
| EP | 3494954 | 6/2019 |
| EP | 3502196 A1 | 6/2019 |
| EP | 3494182 B1 | 4/2020 |
| JP | 07072660 A * | 3/1995 |
| JP | H0762035 A | 3/1995 |
| JP | H0772660 A | 3/1995 |
| JP | 2018/039936 A | 3/2018 |
| WO | WO2014/042653 | 3/2014 |
| WO | WO 2014/047089 A1 | 3/2014 |
| WO | WO 2014/201674 A1 | 12/2014 |
| WO | WO2015091318 | 6/2015 |
| WO | WO 2015/158649 | 10/2015 |
| WO | WO 2013/189746 A1 | 12/2016 |
| WO | WO 2017/134002 | 8/2017 |
| WO | WO2018/087287 A1 | 5/2018 |
| WO | WO2018/143957 | 8/2018 |
| WO | WO2018/143959 | 8/2018 |
| WO | WO2018/143962 | 8/2018 |
| WO | WO2018/158436 A1 | 9/2018 |
| WO | WO 2020/194136 | 10/2020 |
| WO | WO 2021/080772 A1 | 4/2021 |
| WO | WO 2021/099943 | 5/2021 |

OTHER PUBLICATIONS

International Agency for Research on Cancer "N-methylolacrylamide" IARC Monographs on the Evaluation of Carcinogenic Risks to Humans, No. 60 (Year: 1994).

* cited by examiner

ORGANIC ADDITIVES AND COMPOSITIONS CONTAINING THE SAME

BACKGROUND

Additives are often included in toner compositions and additive manufacturing compositions in order to tune the properties thereof. Silica, as well as other inorganic additives, are used as additives to improve flow, triboelectric charging properties, and toner blocking at elevated temperatures. Some polymeric additives have also been developed for such purposes. However, the properties of such additives have been somewhat limited by the nature of the monomers used to form the polymeric additives.

SUMMARY

Organic additives are provided, which may be used in a variety of compositions including toner compositions and additive manufacturing compositions. The organic additives are polymeric materials formed using dioxane/dioxolane monomers. The dioxane/dioxolane moieties present in these monomers impart useful properties to compositions which include the organic additives. For example, embodiments of the organic additives provide toner compositions having significantly improved blocking performance as compared to existing polymeric additives, even without negatively affecting other properties such as charging, cohesion, and sensitivity to humidity. In addition, embodiments of the organic additives exhibit significantly improved thermal stability as compared to existing polymeric additives.

Compositions are provided which, in embodiments, comprise a plurality of organic additive particles, the particles comprising a polymerization product of reactants comprising a dioxane/dioxolane monomer and a vinyl co-monomer, wherein the dioxane/dioxolane monomer is an ester of (meth)acrylic acid with an alcohol comprising a dioxane moiety, an ester of (meth)acrylic acid with an alcohol comprising a dioxolane moiety, or both.

Toner compositions are also provided, which in embodiments, comprise: toner particles; a colorant; a plurality of organic additive particles, the particles comprising a polymerization product of reactants comprising a dioxane/dioxolane monomer, a vinyl co-monomer, a multifunctional vinyl monomer, and an additional vinyl monomer selected from a group consisting of fluorinated vinyl monomers, vinyl monomers comprising a nitrogen-containing group, and combinations thereof, wherein the dioxane/dioxolane monomer is an ester of (meth)acrylic acid with an alcohol comprising a dioxane moiety, an ester of (meth)acrylic acid with an alcohol comprising a dioxolane moiety, or both; and optionally, a wax.

Additive manufacturing compositions are also provided, which in embodiments, comprise a polymeric material, a metal material, or a combination thereof; and a plurality of organic additive particles, the particles comprising a polymerization product of reactants comprising a dioxane/dioxolane monomer and vinyl co-monomer, wherein the dioxane/dioxolane monomer is an ester of (meth)acrylic acid with an alcohol comprising a dioxane moiety, an ester of (meth)acrylic acid with an alcohol comprising a dioxolane moiety, or both.

Other principal features and advantages of the disclosure will become apparent to those skilled in the art upon review of the following drawings, the detailed description, and the appended claims.

DETAILED DESCRIPTION

Organic additives are provided, which may be used in a variety of compositions in addition to, or as a replacement for, inorganic additives such as silica, titania, and alumina, as well as other types of polymeric additives. The organic additives are polymeric materials in the form of small particles. The organic additives are formed by polymerizing various monomers. At least one type of monomer is used to form the polymeric material of the organic additives, which is an ester of (meth)acrylic acid with an alcohol comprising a dioxane moiety or an alcohol comprising a dioxolane moiety. (The use of "(meth)" as in, e.g., "(meth)acrylic acid", refers to both acrylic acid and methacrylic acid.) In the present disclosure, this type of monomer may be referred to as an "dioxane/dioxolane monomer." This phrase, dioxane/dioxolane monomer, encompasses the monomer which is the ester of (meth)acrylic acid with the alcohol comprising the dioxane moiety, the monomer which is the ester of (meth)acrylic acid with the alcohol comprising the dioxolane moiety, and both such monomers. The dioxane moiety may be a 1,3-dioxane moiety and the dioxolane moiety may be a 1,3-dioxolane moiety. The alcohol comprising the dioxane/dioxolane moiety may be an acetal of a triol, a ketal of a triol, or a carbonate of a triol. Illustrative triols include glycerol and trimethylolpropane. The triol may be unsubstituted or substituted. By "substituted" it is meant that one or more bonds to a carbon(s) or hydrogen(s) are replaced by a bond to non-hydrogen and non-carbon atoms. The dioxane/dioxolane monomer may have Formula I (dioxane) or II (dioxolane) as shown below, wherein R is selected from hydrogen and methyl; R' is selected from hydrogen and ethyl; and Z is selected from hydrogen, an oxygen of a carbonyl group, an alkyl group, an aryl group, and an alkoxy group. Either or both types of monomers may be used in the resin particles.

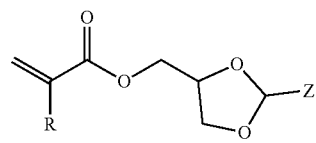

Formula I

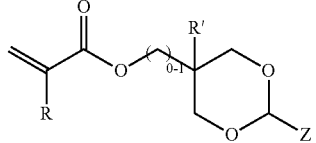

Formula II

The carbonyl group refers to a C=O group, that is Z is O covalently bound to the carbon via a double bond, thereby forming a carbonyl group between the two oxygens of the 5 or 6-membered ring. The alkyl group may be linear or branched. The alkyl group may have from 1 to 20 carbons. This includes having from 1 to 18 carbons and from 1 to 10 carbons, e.g., 1, 2, 3, 4, 5, 6, 7, 8, 9, or 10 carbons. The alkyl group may be substituted or unsubstituted. The aryl group may be monocyclic having one aromatic ring, e.g., benzene, or polycyclic having one or more fused rings. The aryl group may be unsubstituted or substituted as described above with respect to the alkyl group, although substituted aryl groups also encompass aryl groups in which a bond to a hydrogen(s)

is replaced by a bond to an unsubstituted or substituted alkyl group as described above. The alkoxy group refers to an —O-alkyl group.

Illustrative dioxane/dioxolane monomers include glycerol formal (meth)acrylate, trimethylolpropane formal (meth) acrylate, and isopropylideneglycerol (meth)acrylate. A single type of combinations of different types of dioxane/dioxolane monomers may be used. In embodiments, however, the dioxane/dioxolane monomer is glycerol formal (meth)acrylate. In the present disclosure, the name "glycerol formal (meth)acrylate" (as well as the names of the other dioxane/dioxolane monomers described in this paragraph) refers to either the dioxane isomer, the dioxolane isomer, or both. That is, all possibilities are encompassed by the names.

A vinyl co-monomer is also used to form the polymeric material of the organic additive. The vinyl co-monomer is one having a relatively high C/O ratio. The C/O ratio may be from 3 to 8, from 4 to 7, or from 5 to 6. The vinyl co-monomer may be an aliphatic cyclo(meth)acrylate. Illustrative aliphatic cyclo(meth)acrylates include the following: cyclohexyl methacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, benzyl methacrylate, and phenyl methacrylate. A single type or combinations of different types of these vinyl co-monomers may be used. The aliphatic group of the cyclo(meth)acrylates may have 3 or more carbons, 4 or more carbons, 5 or more carbons, or from 3 to 8 carbons.

A multifunctional vinyl monomer, i.e., comprising more than one vinyl polymerizable group (e.g., 2, 3, 4), may be used to form the polymeric material of the organic additive, although in embodiments, a multifunctional vinyl monomer is not required. Multifunctional vinyl monomers achieve crosslinking within the organic additive. Multifunctional vinyl monomers comprising two or more vinyl groups may be used. Illustrative multifunctional vinyl monomers include the following: diethyleneglycol diacrylate, triethyleneglycol diacrylate, tetraethyleneglycol diacrylate, poly(ethyleneglycol) diacrylate, 1,6-hexanediol diacrylate, neopentylglycol diacrylate, tri(propyleneglycol) diacrylate, poly(propyleneglycol) diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2',-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthalene, and divinyl ether. Other illustrative multifunctional vinyl monomers include the following: Bisphenol A ethoxylate diacrylate, Bisphenol A ethoxylate dimethacrylate, Bisphenol A dimethacrylate, Bisphenol A ethoxylate diacrylate, Methyl 2-(trifluoromethyl)acrylate, 10-Decanediol dimethacrylate, 1,10-Decanediol dimethacrylate, 1,4-Phenylene dimethacrylate, Pyromellitic dianhydrate dimethacrylate, Pyromellitic dianhydride glycerol dimethacrylate, Di(trimethylolpropane) tetraacrylate, Diurethane dimethacrylate, 1,3-Butanediol diacrylate, 1,4-Butanediol diacrylate, 1,3-Butanediol dimethacrylate, 1,4-Butanediol dimethacrylate, Glycerol 1,3-diglycerolate diacrylate, Glycerol dimethacrylate, Neopentyl glycol propoxylate, Pentaerythritol tetraacrylate, Pentaerythritol triacrylate, Trimethylolpropane ethoxylate (1 EO/OH) methyl ether diacrylate, Trimethylolpropane ethoxylate triacrylate, Trimethylolpropane propoxylate triacrylate, 1,4 Cyclohexanedimethanol divinyl ether, 1,4-Bis(4-vinylphenoxy)butane, and Divinyl sulfone. A single type or combinations of different types of multifunctional vinyl monomers may be used.

An additional vinyl monomer may be used to form the polymeric material of the organic additive. By contrast to the multifunctional vinyl monomer, however, this additional vinyl monomer may be monofunctional having a single polymerizable vinyl group. The additional vinyl monomer may be selected from acrylic monomers such as acrylates, acrylamides and methacrylamides, acrylic acids, acrylonitrile, bisphenol acrylics, fluorinated acrylics, and methacrylates; styrene and styrene monomers functionalized by other than vinyl polymerizable groups; and vinyl esters and vinyl ethers.

Specific illustrative additional vinyl monomers include the following: 2-Acrylamido-2-methyl-1-propanesulfonic acid, 2-Acrylamido-2-methyl-1-propanesulfonic acid, 3-(Acrylamido)phenylboronic acid, (3-Acrylamidopropyl)trimethylammonium chloride, 3-O-Acryloyl-1,2:5,6-bis-O-isopropylidene-D-glucofuranose, N-Acryloyl-L-valine, Alkylacrylamide, 2-Aminoethylmethacrylamide hydrochloride, N-(3-Aminopropyl)methacrylamide hydrochloride, N,N-Diethylacrylamide, N,N-Diethylmethacrylamide, N,N-Dimethylacrylamide, N-[3-(Dimethylamino)propyl]methacrylamide, N,N'-Hexamethylenebis(methacrylamide), N-Hydroxyethyl acrylamide, N-(Hydroxymethyl)acrylamide, (4-Hydroxyphenyl)methacrylamide, 2-Hydroxypropyl methacrylamide, N-(Isobutoxymethyl)acrylamide, N-Isopropylacrylamide, N-Isopropylacrylamide, N-Isopropylmethacrylamide, Methacrylamide, N-(3-Methoxypropyl)acrylamide, N-Phenylacrylamide, N-(Triphenylmethyl)methacrylamide, N-[Tris(hydroxymethyl)methyl]acrylamide, 4-Acetoxyphenethyl acrylate, 6-Acetylthiohexyl methacrylate, Acrylic anhydride, Acryloxyethyl thiocarbamoyl rhodamine B, Acryloyl chloride, 4-Acryloylmorpholine, [2-(Acryloyloxy)ethyl]trimethylammonium chloride, 2-(4-Benzoyl-3-hydroxyphenoxy)ethyl acrylate, Benzyl acrylate, Benzyl 2-propylacrylate, Butyl acrylate, tert-Butyl acrylate, 2-[[(Butylamino)carbonyl]oxy]ethyl acrylate, tert-Butyl 2-bromoacrylate, 2-Carboxyethyl acrylate, 2-Chloroethyl acrylate, 2-(Diethylamino)ethyl acrylate, Di(ethylene glycol) ethyl ether acrylate, 2-(Dimethylamino)ethyl acrylate, 3-(Dimethylamino)propyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobutyl acrylate, (2-Isobutyl-2-methyl-1,3-dioxolan-4-yl)methyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 2-(chloromethyl)acrylate, Octadecyl acrylate, Pentabromobenzyl acrylate, Pentabromophenyl acrylate, Pentafluorophenyl acrylate, Poly(ethylene glycol) methyl ether acrylate, Poly(propylene glycol) acrylate, epoxidized acrylate, 3-Sulfopropyl acrylate, Tetrahydrofurfuryl acrylate, 2-Tetrahydropyranyl acrylate, 3,5,5-Trimethylhexyl acrylate, 10-Undecenyl acrylate, 4-Acetoxyphenethyl acrylate, 6-Acetylthiohexyl methacrylate, Acrylic anhydride, Acryloxyethyl thiocarbamoyl rhodamine B, 4-Acryloylmorpholine 97%, [2-(Acryloyloxy)

ethyl]trimethylammonium chloride, 2-(4-Benzoyl-3-hydroxyphenoxy)ethyl acrylate, Benzyl acrylate, Benzyl 2-propylacrylate, Butyl acrylate, tert-Butyl acrylate, 2-[[(Butylamino)carbonyl]oxy]ethyl acrylate, tert-Butyl 2-bromoacrylate, 2-Carboxyethyl acrylate, 2-Chloroethyl acrylate, 2-(Diethylamino)ethyl acrylate, Di(ethylene glycol) ethyl ether acrylate, 2-(Dimethylamino)ethyl acrylate, 3-(Dimethylamino)propyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl, Ethylene glycol methyl ether acrylate, Ethylene glycol phenyl ether acrylate, Ethyl 2-ethylacrylate, 2-Ethylhexyl acrylate, Ethyl 2-propylacrylate, Hexyl acrylate, 4-Hydroxybutyl acrylate, 2-Hydroxyethyl acrylate 96%, 2-Hydroxy-3-phenoxypropyl acrylate, Isobutyl acrylate, (2-Isobutyl-2-methyl-1,3-dioxolan-4-yl)methyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 2-(chloromethyl)acrylate, Methyl 3-hydroxy-2-methylenebutyrate, Octadecyl acrylate, Pentabromobenzyl acrylate, Pentabromophenyl acrylate, 3-Sulfopropyl acrylate, Tetrahydrofurfuryl acrylate, 2-Tetrahydropyranyl acrylate, 3,5,5-Trimethylhexyl acrylate, 10-Undecenyl acrylate, Acrylic acid, acrylonitrile, phenyl2-(2-Bromoisobutyryloxy)ethyl methacrylate, 2-(tert-Butylamino)ethyl methacrylate, Butyl methacrylate, tert-Butyl methacrylate, 3-Chloro-2-hydroxypropyl methacrylate, 3,3'-Diethoxypropyl methacrylate, 2-(Diethylamino)ethyl methacrylate, Diethylene glycol butyl ether methacrylate, Di(ethylene glycol) methyl ether methacrylate, 2-(Diisopropylamino)ethyl methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Ethyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxy-3-{3-[2,4,6,8-tetramethyl-4,6,8-tris(propyl glycidyl ether)-2-cyclotetrasiloxanyl]propoxy}propyl methacrylate, Isobutyl methacrylate, 2-Isocyanatoethyl methacrylate, Isodecyl methacrylate, Lauryl methacrylate, Methacrylic acid N-hydroxysuccinimide ester, 4-Methacryloxyethyl trimellitic anhydride, Methyl methacrylate, 2-(Methylthio)ethyl methacrylate, mono-2,2-N-Morpholinoethyl methacrylate, 1-Naphthyl methacrylate, Pentabromophenyl methacrylate, Phosphoric acid 2-hydroxyethyl methacrylate ester, Poly(ethylene glycol) behenyl ether methacrylate, Poly(ethylene glycol) 2,4,6-tris(1-phenylethyl)phenyl ether methacrylate, Poly(propylene glycol) methacrylate, 2-[2-(3-Prop-1-en-2-ylphenyl)propan-2-ylcarbamoyloxy]ethyl methacrylate, Propyl methacrylate, 1-Pyrenemethyl methacrylate, Stearyl methacrylate, 3-Sulfopropyl methacrylate, TEMPO methacrylate, Tetrahydrofurfuryl methacrylate, Triethylene glycol methyl ether methacrylate, 3,3,5-Trimethylcyclohexyl methacrylate, Vinyl methacrylate, 3-(Acryloyloxy)-2-hydroxypropyl methacrylate.

Other specific illustrative additional vinyl monomers include the following: 4-Acetoxystyrene, 4-Benzhydrylstyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 2-Chlorostyrene, 3-Chlorostyrene, 4-Chlorostyrene, 2,6-Dichlorostyrene, 3,4-Dimethoxystyrene, 2,4-Dimethylstyrene, 2,5-Dimethylstyrene, N,N-Dimethylvinylbenzylamine, 4-(Diphenylphosphino)styrene, 4-Ethoxystyrene, 4-[N-(Methylaminoethyl) aminomethyl]styrene, 3-Methylstyrene, 4-Methylstyrene, α-Methylstyrene, 3-Nitrostyrene, 2,4,6-Trimethylstyrene.

Other specific illustrative additional vinyl monomers include the following: Sodium 4-vinylbenzoic acid, 3-Vinylaniline, 4-Vinylaniline, 9-Vinylanthracene, 4-Vinylbenzocyclobutene, 3-Vinylbenzoic acid, 4-Vinylbenzoic acid, Vinylbenzyl chloride, 4-Vinylbenzyl chloride, 4-Vinylbenzyl(triphenyl)phosphonium chloride, 4-Vinylbiphenyl, 2-Vinylnaphthalene, Vinyl acetate, Vinyl benzoate, Vinyl 4-tert-butylbenzoate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl valerate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol vinyl ether, Cyclohexyl vinyl ether, Di(ethylene glycol) divinyl ether, Di(ethylene glycol) vinyl ether, Diethyl vinyl orthoformate, Dodecyl vinyl ether, Ethylene glycol vinyl ether, 2-Ethylhexyl vinyl ether, Ethyl vinyl ether, Isobutyl vinyl ether, Phenyl vinyl ether, Propyl vinyl ether, N-Ethyl-2-vinylcarbazole, Ethyl vinyl sulfide, N-Methyl-N-vinylacetamide, 9-Vinylanthracene, 9-Vinylcarbazole, N-Vinylformamide, 2-Vinylnaphthalene, Vinylphosphonic acid, N-Vinylphthalimide, 2-Vinylpyridine, 4-Vinylpyridine, 1-Vinyl-2-pyrrolidinone, Vinylsulfonic acid.

Fluorinated vinyl monomers may also be used as the additional vinyl monomer, including the following: 2,2,3,3,4,4,5,5,6,6,7,7-Dodecafluoroheptyl acrylate, 3,3,4,4,5,5,6,6,7,7,8,8,9,9,10,10,11,11,12,12,12-Heneicosafluorododecyl acrylate, 3,3,4,4,5,5,6,6,7,7,8,8,9,9,10,10,10-Heptadecafluorodecyl methacrylate, 2,2,3,3,4,4,4-Heptafluorobutyl acrylate, 2,2,3,3,4,4,4-Heptafluorobutyl methacrylate, 2,2,3,4,4,4-Hexafluorobutyl acrylate, 1,1,1,3,3,3-Hexafluoroisopropyl acrylate, 2,2,3,3,4,4,5,5-Octafluoropentyl acrylate, 2,2,3,3,4,4,5,5-Octafluoropentyl methacrylate, Pentafluorophenyl acrylate, 2,2,3,3,3-Pentafluoropropyl acrylate, 2,2,3,3,3-Pentafluoropropyl methacrylate, 1H,1H,2H,2H-Perfluorodecyl acrylate, 2,2,3,3-Tetrafluoropropyl methacrylate, 3,3,4,4,5,5,6,6,7,7,8,8-Tridecafluorooctyl acrylate, 3,3,4,4,5,5,6,6,7,7,8,8-Tridecafluorooctyl methacrylate, 2,2,2-Trifluoroethyl methacrylate, Methyl 2-(trifluoromethyl)acrylate, 2-[3-(2H-Benzotriazol-2-yl)-4-hydroxyphenyl]ethyl methacrylate, Pentafluorophenyl methacrylate, 2-[(1',1',1'-Trifluoro-2'-(trifluoromethyl)-2'-hydroxy)propyl]-3-norbornyl methacrylate, 2,6-Difluorostyrene, 2-Fluorostyrene, 3-Fluorostyrene, 4-Fluorostyrene, Pentafluorophenyl 4-vinylbenzoate, 2,3,4,5,6-Pentafluorostyrene, 2-(Trifluoromethyl)styrene, 3-(Trifluoromethyl)styrene, 4-(Trifluoromethyl)styrene, Vinyl trifluoroacetate.

The additional vinyl monomer may comprise a nitrogen-containing group, including such monomers which have been disclosed above. For example, the additional vinyl monomer comprising the nitrogen-containing group may be dimethylaminoethyl methacrylate, diethylaminoethyl methacrylate, dipropylaminoethyl methacrylate, diisopropylaminoethyl methacrylate, or dibutylaminoethyl methacrylate.

The additional vinyl monomer, if used in forming the polymeric material of the organic additive, may be of a single type or a combination of different types.

The selection of the types of dioxane/dioxolane monomer, vinyl co-monomer, multifunctional vinyl monomer (if present), additional vinyl monomer (if present), and combinations thereof depends, at least in part, upon the desired properties for the organic additive. The selection of the relative amounts of the monomers (described below) also depends on the desired properties for the organic additive. Advantageously, the organic additives offer a greater degree of chemical diversity as compared to inorganic additives, and thus, afford wider range of properties. In addition, the dioxane/dioxolane moieties provide advantageous properties as compared to existing polymeric additives.

In embodiments, certain monomers may be excluded in forming the resin particles. Excluded monomers may include one or more of the following: vinyl-imidazolium monomers, urethane (meth)acrylate monomers, and silyl ester monomers such as (meth)acrylic acid triisoproylsilyl ester.

Generally, seeded emulsion polymerization is used to form the organic additive from the selected monomers. This technique involves use of an emulsion comprising the selected monomers, a solvent, an initiator (included in this emulsion or separately added in a distinct step(s)), and optionally, a surfactant. An amount of the emulsion (e.g., from 0.5% to 10% of the total amount of the emulsion) is exposed to conditions which induce polymerization reactions between monomers to form seed particles composed of the polymeric material from which the organic additive is composed. An additional amount of the emulsion (e.g., the remaining amount) is then supplied under conditions to further induce polymerization reactions and grow the seed particles to a desired size. The emulsion polymerization may be carried out in any suitable reactor and using any suitable conditions. Illustrative conditions are described in the Example below. However, variations in these conditions are encompassed, e.g., different mixing speeds, reaction times, reaction temperatures, etc., in order to tune properties of the resulting organic additive.

The emulsion polymerization provides an organic additive latex, i.e., the organic additive as particles dispersed in the solvent. Further processing steps may be used, e.g., to recover the organic additive particles from the solvent. These processing steps include, e.g., filtration, drying, centrifugation, spray drying, freeze drying, etc. Recovered organic additive particles may then be added to any desired composition, e.g., toner compositions, additive manufacturing composition, etc., as further described below.

Recovered organic additive particles may be described as a dry powder. Such a composition may be described as being free of (i.e., not comprising) a resin/polymer other than what is provided by the present organic additive particles themselves. This includes being free of a polyurethane, a polyurethane (meth)acrylate, a poly(meth)acrylate (other than the organic additive particles themselves), a polyester, a silyl ester copolymer, a silyl (meth)acrylate polymer, or combinations thereof.

Since the resin/polymer making up the organic additive particles has already been polymerized, the composition itself is generally not curable and as such, is free of (i.e., does not comprise) an initiator. This does not preclude the presence of a minor amount of unreacted initiator or reacted initiator which may be incorporated into polymer chains. Similarly, the organic additive composition may be described as being free of (i.e., not comprising monomers).

In embodiments, the organic additive composition may also be described as being free of (i.e., not comprising) a fungicide/biocide such as medetomidine.

Water is generally used as the solvent in the emulsion, but other solvents may be included such as acetone, ethyl acetate, methanol, and combinations thereof.

An initiator is used in the emulsion polymerization process to facilitate the polymerization reactions. It may be present in (or added to) the emulsion at an amount of, e.g., from 0.1 to 8 weight percent or from 0.2 to 5 weight percent of the total weight of the monomers. A single type or combinations of different types of initiators may be used.

Suitable initiators include water soluble initiators, such as ammonium persulfate, sodium persulfate and potassium persulfate. Other water-soluble initiators include azoamidine compounds, for example 2,2'-azobis(2-methyl-N-phenyl-propionamidine) dihydrochloride, 2,2'-azobis[N-(4-chlorophenyl)-2-methylpropionamidine]di-hydrochloride, 2,2'-azobis[N-(4-hydroxyphenyl)-2-methyl-propionamidine]dihydrochloride, 2,2'-azobis[N-(4-amino-phenyl)-2-methylpropionamidine]tetrahydrochloride, 2,2'-azobis[2-methyl-N(phenylmethyl)propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2' azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl)propane]dihydrochloride, and 2,2'-azobis{2-[1-(2-hydroxyethyl)-2-imidazolin-2-yl]propane}dihydrochloride. Redox initiators may be used.

A surfactant is generally used in the emulsion, although in embodiments, no surfactant is required. Anionic, cationic, or nonionic surfactants may be used. They may be present in the emulsion, e.g., at an amount of from 0.01 to 15 weight percent or from 0.1 to 10 weight percent of the total weight of the monomers. A single type or combinations of different types of surfactants may be used.

Anionic surfactants include sulfates and sulfonates such as sodium dodecylsulfate (SDS) also known as sodium lauryl sulfate (SLS), sodium dodecylbenzene sulfonate, sodium dodecylnaphthalene sulfate, dialkyl benzenealkyl sulfates and sulfonates; acids such as abietic acid available from Aldrich, NEOGEN™, NEOGEN SC™ obtained from Daiichi Kogyo Seiyaku Co., Ltd. Other suitable anionic surfactants include DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates.

Cationic surfactants include ammoniums such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and $C_{12}$, $C_{15}$, $C_{17}$ trimethyl ammonium bromides. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, and SANISOL (benzalkonium chloride), available from Kao Chemicals. A suitable cationic surfactant includes SANISOL B-50 available from Kao Corp., which is primarily a benzyl dimethyl alkonium chloride.

Nonionic surfactants include alcohols, acids and ethers. For example, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, and dialkylphenoxy poly(ethyleneoxy)ethanol may be used. Commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ may be used.

The organic additives formed by the emulsion polymerization techniques described above may be characterized by their composition. As noted above, the polymeric material of the organic additive is the result of polymerization reactions between various combinations of monomers to form a polymerization product. For clarity, the composition of the polymeric material/organic additive may be identified by reference to the monomers which are polymerized, recognizing that the chemical form of those monomers is generally altered as a result of the polymerization reactions. The polymerization product, and thus, the organic additive, may comprise other components present in the emulsion described above. For example, initiators (or a portion thereof, e.g., a sulphate group) may become incorporated at the beginning of polymer chains. Surfactants may become entangled with polymer chains and embedded within the organic additive particles, e.g., due to strong noncovalent binding.

In embodiments, the organic additive comprises (or consists of) a polymerization product of reactants comprising a dioxane/dioxolane monomer, a vinyl co-monomer (e.g., an aliphatic cyclo(meth)acrylate monomer), and optionally, one or more of a multifunctional vinyl monomer, an additional vinyl monomer, and an initiator. Any of the dioxane/dioxolane monomers, vinyl co-monomers, multifunctional vinyl monomers, additional vinyl monomers, and initiators described herein may be used.

Using a specific, illustrative composition, the composition of the organic additive particles may also be identified as crosslinked poly[(glycerol formal (meth)acrylate)-ran-(cyclohexyl methacrylate)-ran-(dimethylaminoethyl methacrylate)]. In this description, the different chemical moieties which result from the polymerization reactions is identified by reference to the corresponding monomer in its parenthesis and "ran" refers to the random incorporation of the different monomers into the copolymer. The use of this description encompasses the presence of an initiator (or portion thereof) at the beginning and end of each copolymer as well as crosslinking via the multifunctional monomer.

In embodiments in which certain monomers are excluded from forming the organic additive particles, it follows that such monomers do not participate in the polymerization reactions to form the polymeric matrix of the organic additive particles. Thus, in these embodiments, the composition of the organic additive particles may be described as being free of (i.e., not comprising) one or more of vinylimidazolium monomers, urethane-containing monomers (i.e., monomers comprising a urethane group), and silyl ester monomers such as (meth)acrylic acid triisoproylsilyl ester.

In any of the embodiments referenced in the paragraph above, the dioxane/dioxolane monomer may be present in an amount of from 1 to 50 weight percent of the total weight of monomers. This includes, e.g., from 5 to 40 weight percent and from 10 to 30 weight percent. If more than one type of dioxane/dioxolane monomer is used, these values refer to the total amount of dioxane/dioxolane monomer. The other monomers (e.g., vinyl co-monomer, multifunctional vinyl monomer, and/or additional vinyl monomer) may be present in an amount of from 50 to 99 weight percent of the total weight of monomers. In any of these embodiments, the vinyl co-monomer may be present in an amount of from 50 to 99 weight percent of the total weight of monomers. This includes, e.g., from 60 to 90 weight percent and from 70 to 90 weight percent. If more than one type of vinyl co-monomer is used, these values refer to the total amount of vinyl co-monomer. In any of these embodiments, the multifunctional vinyl monomer, if present, may be at an amount of up to 40 weight percent of the total weight of monomers. This includes, e.g., from 8 to 40 weight percent and 10 to 30 weight percent. If more than one type of multifunctional vinyl monomer is used, these values refer to the total amount of multifunctional vinyl monomer. In any of these embodiments, the additional vinyl monomer, if present, may be at an amount of up to 35 weight percent of the total weight of monomers. This includes, e.g., up to 20 weight percent and from 0.5 to 10 weight percent. If more than one type of additional vinyl monomer is used, these values refer to the total amount of additional vinyl monomer. As noted above, an amount of initiator and optionally, surfactant may also be present.

In any of the embodiments referenced in the paragraph above, one or more of the following variations may be used. Glycerol formal methacrylate may be used as the dioxane/dioxolane monomer (or one of the dioxane/dioxolane monomers). Cyclohexyl methacrylate may be used as the vinyl co-monomer (or one of the vinyl co-monomers). Divinyl benzene may be used as the multifunctional vinyl monomer (or one of the multifunctional vinyl monomers). A monomer comprising a nitrogen-containing group may be used as the additional vinyl monomer (or one of the additional vinyl monomers), which may be present at an amount of from 0.1 to 1.5 weight percent of the total weight of monomers. The monomer comprising a nitrogen-containing group may be dimethylaminoethyl methacrylate.

The organic additives may be characterized by their size and morphology. As noted above, they are particulate in form. They are generally spherical in shape, but this does not mean perfectly spherical, as some particles may have ellipsoid, ovoid, or irregular shapes. The size of the organic additive particles may be reported as a $D_{50}$ particle size, which refers to a diameter at which 50% of the sample (on a volume basis) is comprised of particles having a diameter less than said diameter value. In embodiments, the organic additive has a $D_{50}$ particle size in a range of from 20 nm to 500 nm, 25 nm to 200 nm, from 40 nm to 150 nm, or from 40 nm to 100 nm. The $D_{50}$ particle size may be measured using a Nanotrac 252 instrument. This instrument uses a laser light-scattering technique, in which Doppler-shifted light generated from each particle in motion (Brownian motion) is measured. The signals generated by these shifts are proportional to the size of the particles. The signals are mathematically converted to particle size and size distribution. The analysis can be performed using an external probe or by inserting the probe into a fixed sample chamber. For light scattering techniques, NIST polystyrene Nanosphere control samples with a diameter within the range of 15 mm to 150 mm under the tradename NIST Traceable Reference Material for Nanotrac Particle Size Analyzers obtained from Microtrac may be used.

The organic additives may be characterized by their thermal stability. Thermal stability may be quantified by the organic additive's onset temperature of degradation. This onset temperature may be measured using a thermogravimetric analyzer as described in the Examples, below. In embodiments, the onset temperature is at least 290° C., at least 295° C., at least 300° C., or in a range of from 290° C. to 360° C.

As noted above, the organic additives may be used in a variety of compositions, for example compositions which generally include an inorganic additive such as silica, titania, or alumina. Illustrative such compositions include toners and additive manufacturing compositions, each of which are further described below. The organic additives may be included in such compositions using various techniques, including mixing, blending, spraying, dipping, etc., the organic additive (or organic additive latex) with/onto/into the desired composition. In embodiments, the organic additive is adsorbed onto a surface of particles of the desired composition, including forming a coating, layer, or film thereon. The amount of organic additive used generally depends on the desired properties for the composition. However, in embodiments, the organic additive is used at an amount in a range of from 0.1 to 10 weight percent of the total weight of the desired composition. This includes, e.g., from 0.1 to 5 weight percent and from 0.1 to 2 weight percent.

Toners

The organic additives may be used in toner compositions (toners) comprising toner particles. In such toner compositions, the organic additive particles may be adsorbed onto an external surface of the toner particles. The toner particles are formed from a resin, the type of which is not particularly limited. Illustrative resins, including polyester resins and styrene-acrylate resins, are described below. A single type or combinations of different types of resins may be used.

Crystalline Resin

The resin may be a crystalline polyester resin formed by reacting a diol with a diacid (or diester) in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethyl-propane-1,3-diol, 1,6-hexanediol, 1,7-heptanediol, 1,8-octanediol, 1,9-nonanediol, 1,10-decanediol, 1,12-dodecanediol, combinations thereof, and the like including their structural isomers. The aliphatic diol may be, for example, selected in an amount of from about 40 to about 60 mole percent of the resin, from about 42 to about 55 mole percent of the resin, or from about 45 to about 53 mole percent of the resin, and a second diol may be selected in an amount of from about 0 to about 10 mole percent of the resin or from about 1 to about 4 mole percent of the resin.

Examples of organic diacids or diesters including vinyl diacids or vinyl diesters selected for the preparation of crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, from about 40 to about 60 mole percent of the resin, from about 42 to about 52 mole percent of the resin, or from about 45 to about 50 mole percent of the resin, and a second diacid can be selected in an amount of from about 0 to about 10 mole percent of the resin.

Polycondensation catalysts which may be utilized in forming crystalline (as well as amorphous) polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate), and mixtures thereof. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), poly(propylene-sebecamide), and mixtures thereof. Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide), and mixtures thereof.

In embodiments, the crystalline polyester resin has the following formula (III)

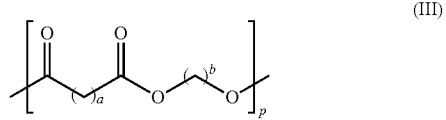

wherein each of a and b may range from 1 to 12, from 2 to 12, or from 4 to 12 and further wherein p may range from 10 to 100, from 20 to 80, or from 30 to 60. In embodiments, the crystalline polyester resin is poly(1,6-hexylene-1,12-dodecanoate), which may be generated by the reaction of dodecanedioc acid and 1,6-hexanediol.

As noted above, the disclosed crystalline polyester resins may be prepared by a polycondensation process by reacting suitable organic diols and suitable organic diacids/diesters in the presence of polycondensation catalysts. A stoichiometric equimolar ratio of organic diol and organic diacid may be utilized, however, in some instances where the boiling point of the organic diol is from about 180° C. to about 230° C., an excess amount of diol, such as ethylene glycol or propylene glycol, of from about 0.2 to 1 mole equivalent, can be utilized and removed during the polycondensation process by distillation. The amount of catalyst utilized may vary, and can be selected in amounts, such as for example, from about 0.01 to about 1 or from about 0.1 to about 0.75 mole percent of the crystalline polyester resin.

The crystalline resin or combination of crystalline resins may be present, for example, in an amount of from about 1 weight % to about 85 weight % by weight of the toner, from about 5 weight % to about 50 weight % by weight of the toner, or from about 10 weight % to about 35 weight % by weight of the toner.

The crystalline resin can possess various melting points of, for example, from about 30° C. to about 120° C., from about 50° C. to about 90° C., or from about 60° C. to about 80° C. The crystalline resin may have a number average molecular weight ($M_n$), as measured by gel permeation chromatography (GPC) of, for example, from about 1,000 to about 50,000, from about 2,000 to about 25,000, or from about 5,000 to about 20,000, and a weight average molecular weight ($M_w$) of, for example, from about 2,000 to about 100,000, from about 3,000 to about 80,000, or from about 10,000 to about 30,000, as determined by GPC. The molecular weight distribution ($M_w/M_n$) of the crystalline resin may be, for example, from about 2 to about 6, from about 3 to about 5, or from about 2 to about 4.

Amorphous Resin

The resin may be an amorphous polyester resin formed by reacting a diol with a diacid or diester in the presence of an optional catalyst. Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, from about 42 to about 52 mole percent of the resin, or from about 45 to about 50 mole percent of the resin.

Examples of diols which may be utilized in generating an amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and combinations thereof. The amount of organic diols selected may vary, for example, the organic diols may be present in an amount from about 40 to about 60 mole percent of the resin, from about 42 to about 55 mole percent of the resin, or from about 45 to about 53 mole percent of the resin.

Examples of suitable amorphous resins include polyesters, polyamides, polyimides, polyolefins, polyethylene, polybutylene, polyisobutyrate, ethylene-propylene copolymers, ethylene-vinyl acetate copolymers, polypropylene, and the like, and mixtures thereof.

An unsaturated amorphous polyester resin may be utilized as a resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

A suitable polyester resin may be an amorphous polyester such as a poly(propoxylated bisphenol A co-fumarate) resin. Examples of such resins and processes for their production include those disclosed in U.S. Pat. No. 6,063,827, the disclosure of which is hereby incorporated by reference in its entirety.

Suitable polyester resins include amorphous acidic polyester resins. An amorphous acid polyester resin may be based on any combination of propoxylated bisphenol A, ethoxylated bisphenol A, terephthalic acid, fumaric acid, and dodecenyl succinic anhydride, such as poly(propoxylated bisphenol-co-terephthlate-fumarate-dodecenylsuccinate). Another amorphous acid polyester resin which may be used is poly(propoxylated-ethoxylated bisphenol-co-terephthalate-dodecenylsuccinate-trimellitic anhydride).

An example of a linear propoxylated bisphenol A fumarate resin which may be utilized as a resin is available under the trade name SPAMII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

An amorphous resin or combination of amorphous resins may be present, for example, in an amount of from about 5 weight % to about 95 weight % by weight of the toner, from about 30 weight % to about 90 weight % by weight of the toner, or from about 35 weight % to about 85 weight % by weight of the toner.

The amorphous resin may have a glass transition temperature of from about 30° C. to about 80° C., from about 35° C. to about 70° C., or from about 40° C. to about 65° C. The glass transition temperature may be measured using differential scanning calorimetry (DSC). The amorphous resin may have a $M_n$, as measured by GPC of, for example, from about 1,000 to about 50,000, from about 2,000 to about 25,000, or from about 1,000 to about 10,000, and a $M_w$ of, for example, from about 2,000 to about 100,000, from about 5,000 to about 90,000, from about 10,000 to about 90,000, from about 10,000 to about 30,000, or from about 70,000 to about 100,000, as determined by GPC.

One, two, or more resins may be used in the toner. Where two or more resins are used, the resins may be in any suitable ratio (e.g., weight ratio) such as for instance of from about 1% (first resin)/99% (second resin) to about 99% (first resin)/1% (second resin), from about 10% (first resin)/90% (second resin) to about 90% (first resin)/10% (second resin). Where the resins include a combination of amorphous and crystalline resins, the resins may be in a weight ratio of, for example, from about 1% (crystalline resin)/99% (amorphous resin) to about 99% (crystalline resin)/1% (amorphous resin), or from about 10% (crystalline resin)/90% (amorphous resin) to about 90% (crystalline resin)/10% (amorphous resin). In some embodiments, the weight ratio of the resins is from about 80 weight % to about 60 weight % of the amorphous resin and from about 20 weight % to about 40 weight % of the crystalline resin. In such embodiments, the amorphous resin may be a combination of amorphous resins, e.g., a combination of two amorphous resins.

Other Resins

The toner particles are not limited to polyester resins. Other resins may be used, such as those formed from various combinations of monomers such as styrenes, acrylates, methacrylates, butadienes, isoprenes, acrylic acids, methacrylic acids, acrylonitriles, acrylamides, methacrylamides, quaternary ammonium halides of dialkyl or trialkyl acrylamides or methacrylamides, vinylpyridines, vinyl pyrrolidones, and vinyl-N-methylpyridinium chloride. Methacrylates include, e.g., beta-carboxyethyl acrylate (β-CEA) and 2-carboxyethyl methacrylate. Other resins may be used such as those disclosed in U.S. Pat. Nos. 6,841,329 and 7,413,842, each of which is hereby incorporated by reference in its entirety. These references also provide illustrative processes for forming such resins.

Illustrative resins include the following: styrene acrylates, styrene butadienes, styrene methacrylates, and more specifically, poly(styrene-alkyl acrylate), poly(styrene-1,3-diene), poly(styrene-alkyl methacrylate), poly (styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly (styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly (methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly (butyl acrylate-isoprene), poly(styrene-propyl acrylate), poly(styrene-butyl acrylate), poly (styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly(styrene-butadiene), poly(styrene-isoprene), poly(styrene-butyl methacrylate), poly(styrene-butyl methacrylate-acrylic acid), poly(butyl methacrylate-butyl acrylate), poly(butyl methacrylate-acrylic acid), poly(acrylonitrile-butyl acrylate-acrylic acid), poly(styrene-butyl acrylate-beta-carboxyethyl acrylate) and the like, and combinations thereof. The polymers may be block, random, or alternating copolymers. The term "alkyl" used in this paragraph may contain from about 1 to about 12 carbon atoms, from about 1 to about 10 carbons, or from about 1 to about 6 carbons. In the resins described in this paragraph, various relative amounts of each monomer may be used as desired.

Similar to the description above regarding polyester resins, one, two, or more resins may be utilized in forming the toner particles. In embodiments, where two or more resins are used, the resins may be in any suitable ratio (e.g., weight ratio) such as, for instance, of from about 1% (first resin)/99% (second resin) to about 99% (first resin)/1% (second resin), in embodiments from about 4% (first resin)/96% (second resin) to about 96% (first resin)/4% (second resin), or about 50% (first resin)/50% (second resin), although weight ratios outside these ranges may be utilized.

Colorant

Various colorants may be included in the toners. The term "colorant" refers, for example, to pigments, dyes, mixtures thereof, such as mixtures of dyes, mixtures of pigments, mixtures of dyes and pigments, and the like. The colorant may be present in the toner in an amount of, for example, from about 0.1% to about 35% by weight of the toner, from about 1% to about 20% by weight of the toner, or from about 5% to about 15% by weight of the toner.

Colorants include carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. Colorants include pigments having the following colors: cyan, magenta, yellow, red, green, brown, blue or mixtures thereof. Pigments are generally used as water-based pigment dispersions.

In general, suitable colorants include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S(Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871 K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991 K (BASF), Paliotol Yellow 1840 (BASF), Novaperm Yellow FGL (Hoechst), Permanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Other suitable water-based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta E02 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850: 1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900™, D6840™, D7080™, D7020™, Pylam Oil BIue™, Pylam Oil Yellow™, Pigment Blue 1™ available from Paul Uhlrich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra (octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

Wax

Optionally, a wax may be included in the toners. When included, the wax may be present in an amount of, for example, from about 1 weight % to about 25 weight % by weight of the toner or from about 5 weight % to about 20 weight % by weight of the toner.

When a wax is used, the wax may include any of the various waxes used in emulsion aggregation toners. Waxes that may be selected include waxes having, for example, an average molecular weight of from about 500 to about 20,000 or from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polymethylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used. Waxes may be included as, for example, fuser roll release agents. In embodiments, the waxes may be crystalline or non-crystalline.

Toner Preparation Process

In order to form the present toners, any of the resins described above may be provided as a latex(es), which may then be utilized as a raw material to form a toner, e.g., by using an emulsion aggregation (EA) and coalescence process. Such a process may involve aggregating a mixture of a latex comprising a resin; a colorant; and optionally, a wax; and then coalescing the mixture. Colorant and wax may be provided to the mixture as separate aqueous dispersions.

Next, the mixture may be homogenized which may be accomplished by mixing at about 600 to about 6,000 revolutions per minute. Homogenization may be accomplished by any suitable means, including, for example, an IKA ULTRA TURRAX T50 probe homogenizer.

An aggregating agent may be added to the mixture. Any suitable aggregating agent may be utilized. Suitable aggregating agents include, for example, aqueous solutions of a divalent cation or a multivalent cation material. The aggregating agent may be, for example, an inorganic cationic aggregating agent such as a polyaluminum halide such as polyaluminum chloride (PAC), or the corresponding bromide, fluoride, or iodide; a polyaluminum silicate such as polyaluminum sulfosilicate (PASS); or a water soluble metal salt including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, and copper sulfate; or combinations thereof. The aggregating agent may be added to the mixture at a temperature that is below the glass transition temperature ($T_g$) of the resin(s). The aggregating agent may be added to the mixture under homogenization.

The aggregating agent may be added to the mixture in an amount of, for example, from about 0 weight % to about 10 weight % by weight of the total amount of resin, from about 0.2 weight % to about 8 weight % by weight of the total amount of resin, or from about 0.5 weight % to about 5 weight % by weight of the total amount of resin.

The particles of the mixture may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for volume average particle size. The aggregation thus may proceed by maintaining an elevated temperature, or slowly raising the temperature to, for example, in embodiments, from about 30° C. to about 100° C., in embodiments from about 30° C. to about 80° C., or in embodiments from about 30° C. to about 50° C. The temperature may be held for a period time of from about 0.5 hours to about 6 hours, or in embodiments from about 1 hour to about 5 hours, while stirring, to provide the aggregated particles. Once the predetermined desired particle size is reached, a shell may be added. The volume average particle size of the particles prior to application of a shell may be, for example, from about 3 µm to about 10 µm, in embodiments, from about 4 µm to about 10 µm, or from about 6 µm to about 9 µm.

Shell Resin

After aggregation, but prior to coalescence, a resin coating may be applied to the aggregated particles to form a shell thereover. Any of the resins described above may be utilized in the shell.

The shell may be applied to the aggregated particles by using the shell resins in the form of a latex(es) as described above. Such latexes may be combined with the aggregated particles under conditions sufficient to form a coating over the aggregated particles. For example, the formation of the shell over the aggregated particles may occur while heating to a temperature of from about 30° C. to about 80° C. or from about 35° C. to about 70° C. The formation of the shell may take place for a period of time from about 5 minutes to about 10 hours or from about 10 minutes to about 5 hours.

Once the desired size of the toner particles is achieved, the pH of the mixture may be adjusted with a pH control agent, e.g., a base, to a value of from about 3 to about 10, or in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, a chelating agent such as ethylene diamine tetraacetic acid (EDTA) may be added to help adjust the pH to the desired values noted above. Other chelating agents may be used.

In embodiments, the size of the core-shell toner particles (prior to coalescence) may be from about 3 µm to about 10 µm, from about 4 µm to about 10 µm, or from about 6 µm to about 9 µm.

Coalescence

Following aggregation to the desired particle size and application of the shell, the particles may then be coalesced to the desired final shape, the coalescence being achieved by, for example, heating the mixture to a temperature of from about 45° C. to about 99° C., from about 55° C. to about 99° C., or about 60° C. to about 98° C., which may be at or above the glass transition temperature of the resins utilized to form the toner particles. Heating may continue or the pH of the mixture may be adjusted (e.g., reduced) over a period of time to reach the desired circularity. The period of time may be from about 1 hours to about 5 hours or from about 2 hours to about 4 hours. Various buffers may be used during coalescence. The total time period for coalescence may be from about 1 to about 9 hours, from about 1 to about 8 hours, or from about 1 to about 5 hours. Stirring may be utilized during coalescence, for example, from about 20 rpm to about 1000 rpm or from about 30 rpm to about 800 rpm.

After aggregation and/or coalescence, the mixture may be cooled to room temperature. The cooling may be rapid or slow, as desired. A suitable cooling process may include introducing cold water to a jacket around the reactor. After cooling, the toner particles may be screened with a sieve of a desired size, filtered, washed with water, and then dried. Drying may be accomplished by any suitable process for drying including, for example, freeze-drying.

Other toner preparation processes may be used, e.g., as described in U.S. Pat. Nos. 6,841,329 and 7,413,842, each of which is hereby incorporated by reference in its entirety.

Other Additives

As described above, the present organic additives are also included in the toners where they may be used in addition to, or in replacement of certain surface additives described above such as silica, titania, and alumina. Application of the organic additives to toner particles may be carried out at described above.

However, in embodiments, the toners may also contain other optional additives. For example, the toners may include positive or negative charge control agents. Surface additives may also be used including metal oxides such as titanium oxide, silicon oxide, aluminum oxides, cerium oxides, tin oxide, strontium titanate, mixtures thereof, and the like; colloidal and amorphous silicas, such as AERO-SIL®, metal salts and metal salts of fatty acids such as zinc stearate, calcium stearate, and magnesium stearate, mixtures thereof and the like; long chain alcohols such as UNILIN 700; and mixtures thereof. Each of these surface additives may be present in an amount of from about 0.1 weight % to about 5 weight % by weight of the toner or from about 0.25 weight % by weight to about 3 weight % by weight of the toner.

Toner Properties

In embodiments, dry toner particles, exclusive of external surface additives/the present organic additives, exhibit one or more of the following characteristics:

(1) Volume average particle size of from about 2.0 µm to about 24.0 µm, from about 2.5 µm to about 10.0 µm, or from about 3.0 µm to about 9.0 µm.

(2) Number Average Geometric Size Distribution (GSDn) and/or Volume Average Geometric Size Distribution (GSDv) of from about 1.05 to about 1.30, from about 1.10 to about 1.25, or from about 1.10 to about 1.20.

(3) Circularity of from about 0.92 to about 1.00, from about 0.95 to about 0.99, or from about 0.96 to about 0.98.

The toners may possess excellent charging characteristics under a variety of relative humidity (RH) conditions, for example, a low-humidity zone (J-zone) of 21.1° C./10% RH and a high humidity zone (A-zone) of about 28° C./85% RH. In embodiments, the toner particles, inclusive of external surface additives/the present organic additives, exhibit one or more of the following characteristics:

(4) A-zone charge to diameter ratio (Q/D) of from about 4 mm to about 10 mm, from about 5 mm to about 9 mm, or from about 6 mm to about 8 mm.

(5) A-zone charge per mass ratio (Q/M) of from about 15 µC/g to about 40 µC/g, from about 20 µC/g to about 35 µC/g, or from about 25 µC/g to about 30 µC/g.

(6) J-zone charge to diameter ratio (Q/D) of from about 9 mm to about 15 mm, from about 10 mm to about 14 mm, or from about 11 mm to about 13 mm.

(7) J-zone charge per mass ratio (Q/M) of from about 40 µC/g to about 65 µC/g, from about 45 µC/g to about 60 µC/g, or from about 50 µC/g to about 55 µC/g.

These characteristics may be measured according to the techniques described in the Example, below.

In embodiments, the toner particles, inclusive of external surface additives/the present organic additives, exhibit one or more of the following characteristics:

(8) Charge maintenance in A-zone after 24 hours in the range of from about 50 percent to about 98 percent, from about 60 percent to about 90 percent, or from about 70 percent to about 80 percent.

(9) Charge maintenance in A-zone after 7 days in the range of from about 65 percent to about 90 percent, from about 70 percent to about 85 percent, or from about 75 percent to about 80 percent.

(10) Cohesion in the range of from about 15 percent to about 70 percent, from about 25 percent to about 60 percent, or from about 35 percent to about 50 percent.

(11) Onset of blocking temperature of greater than about 50.0° C., greater than about 51.0° C. or in the range of from about 50.0° C. to about 55.0° C. or from about 51.0° C. to about 53.0° C.

These characteristics may be measured according to the techniques described in the Example, below, and using the surface additives described in the Example, below.

Developers and Carriers

The toners may be formulated into a developer composition. Developer compositions can be prepared by mixing the toners with known carrier particles, including coated carriers, such as steel, ferrites, and the like. Such carriers include those disclosed in U.S. Pat. Nos. 4,937,166 and 4,935,326, the entire disclosures of each of which are incorporated herein by reference. The toners may be present in the carrier in amounts of from about 1 weight % to about 15 weight % by weight, from about 2 weight % to about 8 weight % by weight, or from about 4 weight % to about 6 weight % by weight. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

Toner Applications

The toners may be used in a variety of xerographic processes and with a variety of xerographic printers. A xerographic imaging process includes, for example, preparing an image with a xerographic printer comprising a charging component, an imaging component, a photoconductive component, a developing component, a transfer component, and a fusing component. In embodiments, the development component may include a developer prepared by mixing a carrier with any of the toners described herein. The xerographic printer may be a high-speed printer, a black and white high-speed printer, a color printer, and the like. Once the image is formed with the toners/developers, the image may then be transferred to an image receiving medium such as paper and the like. Fuser roll members may be used to fuse the toner to the image-receiving medium by using heat and pressure.

In the present disclosure, the phrases "toner" and "toner composition" refer to those compositions which are configured for use in xerographic printers to form images therewith. Thus, in addition to the resins, colorants, present organic additives, and optional wax and other, the toner may include any other component generally used in such compositions in order to form an object using the desired xerographic printer. It is noted that any other exclusions referenced above with respect to the organic additive particles and latex thereof may apply to embodiments of the toner compositions.

Additive Manufacturing Compositions

The organic additives may also be used in additive manufacturing compositions. Additive manufacturing (also known as 3D printing) refers to a number of technologies for fabricating objects based on digital data representing the objects. The digital data is broken down into a series of two-dimensional (2D) cross-sections and the object is fabricated layer-by-layer. There are a number of additive manufacturing technologies, which are based on the types (e.g., polymer, metal, combination thereof) of additive manufacturing composition and its morphology (e.g., powder, pellets, wires, liquids) being used. In embodiments, the additive manufacturing composition comprises a polymeric material (distinct from the present organic additives), a metal material, or combinations thereof. In embodiments, the polymer material or metal material or combination thereof is in the form of a powder. In such compositions, the organic additive particles may be adsorbed onto an external surface of the powder particles. Addition of the present organic additives to such additive manufacturing compositions has been described above.

In embodiments, the additive manufacturing composition comprises a polymeric material. Illustrative polymeric materials include polyamides (PA), polyethylenes (PE), polypropylenes (PP), polyalkanoates, polyesters, polyaryl ether ketones (PAEK), polycarbonates, polyacrylates, polymethacrylates, polystyrenes, polystyrene-acrylates, polyurethanes (PU), thermoplastic polyurethanes (TPU), polyether block amides (PEBA), polyalkyl siloxanes, fluorinated polymers, perfluoropolyether (PFPE) acrylates, and PFPE methacrylates; and copolymers thereof. Other illustrative polymeric materials include polyamide 12 (PA12), polyamide 11 (PA11), polyamide 6 (PA6), polyamide 6,12 (PA6,12), low density polyethylene, high density polyethylene, polyhydroxybutyrate (PHB), polyhydroxyvalerate (PHV), polylactic acid (PLA), polyether ether ketone (PEEK), polyether ketone (PEKK); polyoxymethylene (POM), polymethyl methacrylate (PMMA), polystyrene (PS), high-impact polystyrene (HIPS), polyacrylates and polystyrene-acrylates; polyurethanes (PU), polyacrylonitrile-butadiene-styrene (ABS), polyvinyl alcohol (PVA), polydimethysiloxane (PDMS), polytetrafluoroethylene (PTFE), polyvinyl fluoride (PVF), polyvinylidene fluoride (PVDF), and combinations thereof.

In embodiments, the additive manufacturing composition comprises a thermoplastic polymer. In addition to any thermoplastic polymers that have been listed in the paragraph above, other examples of thermoplastic polymers include polyamides (e.g., Nylon-6, Nylon-12, and the like), polyurethanes, polyethylenes, polypropylenes, polyacetals, polycarbonates, polyethylene or polybutylene terephthalates, glycol-modified polyethyelene terephthalates or polybutylene terephthalates, polystyrenes, polyvinyl chlorides, polytetrafluoroethenes, polylactic acid and other polyesters, polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyaryl ether ketones (PAEK), polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymers, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, the like, and any combination thereof. Copolymers comprising one or more of the foregoing may also be used. Any of the foregoing polymers may be thermoplastic elastomers and comprise a crystalline "hard" segment and an amorphous "soft" segment.

Particularly suitable examples of thermoplastic polymers include polyamides, such as Nylon-6 or Nylon-12; acrylonitrile butadiene styrene; polylactic acid; polyurethanes; poly(arylene ether)s; polyaryletherketones; polycarbonates; polyimides; polyphenylene sulfides; poly(arylene sulfone)s; polyesters, such as polyethylene terephthalate or polybutylene terephthalate or glycol-modified variants thereof; and any combination thereof.

More specific examples of suitable polyamides may include polycaproamide (Nylon 6, polyamide 6, or PA6), poly(hexamethylene succinamide) (Nylon 46, polyamide 46, or PA46), polyhexamethylene adipamide (Nylon 66, polyamide 66, or PA66), polypentamethylene adipamide (Nylon 56, polyamide 56, or PA56), polyhexamethylene sebacamide (Nylon 610, polyamide 610, or PA610), polyundecaamide (Nylon 11, polyamide 11, or PA11), polydodecaamide (Nylon 12, polyamide 12, or PA12), and polyhexamethylene terephthalamide (Nylon 6T, polyamide 6T, or PA6T), Nylon 10.10 (polyamide 10.10 or PA10.10), Nylon 10.12 (polyamide 10.12 or PA10.12), Nylon 10.14 (polyamide 10.14 or PA10.14), Nylon 10.18 (polyamide 10.18 or PA10.18), Nylon 6.10 (polyamide 6.10 or PA6.10), Nylon 6.18 (polyamide 6.18 or PA6.18), Nylon 6.12 (polyamide 6.12 or PA6.12), Nylon 6.14 (polyamide 6.14 or PA6.14), semi-aromatic polyamide, the like, and any combination thereof. Copolyamides may also be used. Examples of suitable copolyamides include, but are not limited to, PA 11/10.10, PA 6/11, PA 6.6/6, PA 11/12, PA 10.10/10.12, PA 10.10/10.14, PA 11/10.36, PA 11/6.36, PA 10.10/10.36, and the like, and any combination thereof. Polyesteramides, polyetheresteramides, polycarbonate-esteramides, and polyether-block-amides, any which may be elastomeric, may also be used.

Examples of suitable polyurethanes include polyether polyurethanes, polyester polyurethanes, mixed polyether and polyester polyurethanes, the like, and any combination thereof. Suitable polyurethanes may include elastomeric polyurethanes, which are prepared by condensation of an isocyanate, a polyol, and a chain extender, where the polyols impart flexibility to the polymer chain and typically constitute a soft segment. Examples of suitable polyurethanes include poly[4,4'-methylenebis(phenylisocyanate)-alt-1,4-butanediol/di(propylene glycol)/polycaprolactone], ELASTOLLAN® 1190A (a polyether polyurethane elastomer, available from BASF), the like, and any combination thereof.

Suitable polyesters are a condensation reaction product formed from a diacid and a diol, or a self-condensation reaction product of a hydroxyacid, such as lactic acid. Glycol-modified polyesters, such as glycol-modified polyethylene terephthalate or glycol-modified polybutylene terephthalate may be particularly suitable. Glycol modification may impart desirable benefits such as optical transparency and flexibility of the polymer chain.

Suitable thermoplastic polymers may be elastomeric or non-elastomeric. Some of the foregoing examples of thermoplastic polymers may be elastomeric or non-elastomeric depending on the specific composition of the polymer. For example, polyethylene that is a copolymer of ethylene and propylene may be elastomeric or not depending on the amount of propylene present in the polymer.

Elastomeric thermoplastic polymers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Particular examples of elastomeric thermoplastic polymers can be found in Handbook of Thermoplastic Elastomers, 2nd ed., B. M. Walker and C. P. Rader, eds., Van Nostrand Reinhold, New York, 1988. Examples of suitable elastomeric thermoplastic polymers include elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of isoprene, isobutylene, butylene, ethylene/butylene, ethylene-propylene, and ethylene-ethylene/propylene. More specific elastomeric styrenic block copolymer examples include poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

In embodiments, the polymeric material can be combined with a non-polymeric material, e.g., glass beads, mineral fillers, pigments, carbon black, carbon fiber, fire retardants, ceramic particles, silica particles, alumina particles, titania particles and metal particles. Regarding metals, these may be a metal, a metal alloy, or a combination thereof. Illustrative metals and metal alloys include aluminum and aluminum alloys, stainless steel, tool steel, titanium and titanium alloys, copper and copper alloys, brass, cobalt chrome (also known as cobalt chromium) alloys, nickel iron alloys, nickel chromium superalloys, precious metals, such as gold, platinum, palladium, silver, tantalum, rhenium and niobium. Other illustrative metals/metal alloys include stainless steel metal powders, including 316 L (low-carbon), 17-4PH, hot-work and maraging steel; low-density aluminum alloys like $AlSi_{10}Mg$ and $AlSi_{12}$; $AlSi_7Mg_{0.6}$, 6061 and 7075-series aluminum alloys; cobalt chrome alloys including ASTM F75 CoCr; titanium alloys including $Ti_6Al_4V$ and $Ti_6Al_4V$ (ELI), where $Ti_6Al_4V$ is a titanium alloy that is 6 percent aluminum and 4 percent vanadium; unalloyed, commercially pure titanium which is available in grades one through four; nickel chromium super-alloys like Inconel® 718 and Inconel® 625; nickel iron alloys such as $FeNi_{36}$ or 64FeNi in the U.S., and also known as Invar®; nickel iron cobalt alloys such as Kovar® a nickel-cobalt ferrous iron alloy compositionally identical to Fernico 1.

Any of the metals and metal alloys described above may also be used by themselves (i.e., without the polymeric material) in the additive manufacturing composition.

Like the toners described above, the additive manufacturing compositions may also comprise additional additives including those described in "Other Additives" above, in the amounts described in that section.

The additive manufacturing compositions comprising the present organic additives may be used in any additive manufacturing system to carry out any additive manufacturing technique, e.g., laser beam melting, selective laser sintering, etc.

In the present disclosure, the phrase "additive manufacturing composition" refers to those compositions which are configured for use in additive manufacturing systems to form objects therewith. Thus, in addition to the polymeric materials, metal materials, present organic additives, and optional other additives, the additive manufacturing composition may include any other component generally used in such compositions in order to form an object using the desired additive manufacturing system. It is noted that any other exclusions referenced above with respect to the organic additive particles and latex thereof may apply to embodiments of the additive manufacturing compositions.

In the present disclosure, the toner compositions and additive manufacturing compositions may be described as being free of an initiator. This does not preclude the presence of a minor amount of unused initiator from the organic additive particles or used initiator which may be incorporated into polymer chains of the organic additive particles.

EXAMPLE

The following Example is being submitted to further define various species of the present disclosure. The Example is intended to be illustrative only and are not intended to limit the scope of the present disclosure. Also, parts and percentages are by weight unless otherwise indicated. As used herein, "room temperature" refers to a temperature of from about 20° C. to about 25° C.

Example 1: Synthesis of Organic Additive Latex with 15% Glycerol Formal Methacrylate In a 2 L buchi reactor, equipped with two HE3 type impellers, 3.75 g of sodium lauryl sulfate (SLS) surfactant (at 30% solids) was added to 816 g deionized water (DIW). The reactor was deoxygenated by passing a stream of nitrogen through it during the reaction. The reactor was ramped to 77° C. and the rpm was set to 350. Separately, in a 1 L glass vessel, equipped with two P4 impellers, a monomer emulsion was prepared by mixing (at 450 rpm) 48 g glycerol formal methacrylate, 190 g cyclohexyl methacrylate (CHMA), 80 g divinyl benzene (DVB), 2.57 g dimethylaminoethyl methacrylate (DMAEMA), 9.18 g SLS surfactant (at 30% solids) and 416 g DIW together. An amount (37.2 g) of seed was taken from the monomer emulsion and pumped into the 2 L reactor at 77° C. An initiator solution prepared from 1.22 g of ammonium persulfate in 34.3 g of DIW was added over 20 minutes after the seed emulsion addition. The remaining monomer emulsion was fed into the reactor over 120 min. Once half the monomer emulsion was added the rpm in the reactor was increased to 450 rpm. At the end of the monomer feed, the latex used a post-processing protocol of 1 hour at 77° C. followed by a 2-hour ramp to 87° C. and a 2 hour hold at 87° C. to reduce residual monomer at the end of the emulsion polymerization step. As well, the reactor rpm was further increased to 530. The resultant latex containing 20% percent solids with a particle size of 84 nm was obtained. Final latex contained 91 ppm residual CHMA and non-detectable amounts of all the remaining monomers used as measured by GC (Gas Chromatography).

The organic additive latex was spray dried with a Yamato spray dryer using inlet and outlet temperatures of 190° C. and 64° C., respectively. The final moisture content was <0.5%. The final dried organic additive was submitted for TGA (thermogravimetric analysis). A TA Instrument Q5000IR system operated using air as the gas was used. Approximately 10-15 mg of sample was weighed into a TGA pan and the pan was put into the instrument. Using 100% air as the carrier gas, the sample was equilibrated at 35° C. and then heated at 5° C. per minute to 400° C. During this temperature profile the weight loss of the sample is plotted as a function of temperature and the first derivative is taken to determine specific end points. The reported data includes percent weight loss at 150° C. and the onset temperature of degradation. In this case, the measured onset temperature of degradation for the organic additive was 298° C.

Comparative Example 1: Synthesis of Organic Additive Latex without Glycerol Formal Methacrylate In a 300-gallon reactor, equipped with two P4 type impellers and a condenser, 0.942 kg of SLS surfactant (at 30% solids) was added to 444 kg deionized water (DIW). The reactor was deoxygenated by passing a stream of nitrogen through it during the reaction and a condenser was used. The reactor was ramped to 77° C. and the rpm was set to 59. Separately, in a 100-gallon reactor equipped with one P4 type impeller, a monomer emulsion was prepared by mixing (at 28 rpm) 126 kg CHMA, 42.45 kg DVB, 1.358 kg DMAEMA, 5.92 kg SLS surfactant (at 30% solids) and 221.1 kg DIW together. A 0.369 kg of seed was taken from the monomer emulsion and pumped into the 300-gallon reactor at 77° C. An initiator solution prepared from 0.645 kg of ammonium persulfate in 7.045 kg of DIW was added over 15 minutes after the seed emulsion addition. The remaining monomer emulsion was fed into the 300-gallon reactor over 120 min. Once half the monomer emulsion was added, the rpm in the reactor was increased to 66 rpm. At the end of the monomer feed, the condenser was turned off. The latex underwent a post-processing protocol of 1 hour at 77° C. followed by a 2-hour ramp to 87° C. and a 1 hour hold at 87° C. to reduce residual monomer at the end of the emulsion polymerization step. During the post-processing protocol, the latex was also pH adjusted to ≥6.0 every 30 minutes with a 0.1 wt % solution of NaOH. The resultant latex containing 20% solids with a particle size of 98 nm was obtained and filtered through a 25-micron filter bag. Final latex contained 194 ppm residual CHMA and non-detectable amounts of all the remaining monomers used as measured by GC (Gas Chromatography).

The latex was spray-dried with a Yamato spray dryer using inlet and outlet temperatures of 190° C. and 64° C., respectively. The final moisture content was <0.5%. The final dried comparative organic additive was submitted for TGA (thermogravimetric analysis). An onset temperature of degradation was measured at 270-285° C.

The significant increased thermal stability for the organic additive of Example 1 as compared to that of Comparative Example 1 is particularly surprising given the similarity in chemical structure of glycerol formal methacrylate to that of cyclohexyl methacrylate and the relatively small amount of glycerol formal methacrylate used as compared to cyclohexyl methacrylate.

Example 2: Toner Composition

A standard Xerox 700 parent cyan toner was blended on a 10-L Henschel (Reliance) mixer with an additive package. However, in the additive package, the large additive silica X24 was replaced with 1.05 pph of the organic additive of Example 1 or the organic additive of Comparative Example 1. Developers were prepared at 5 pph toner and 30 g Xerox 700 carrier.

Toner charging. Toner charging was collected by conditioning samples three days in a low-humidity zone (J zone) at 21.1° C./10% relative humidity, and in a separate sample in a high humidity zone (A zone) at about 28° C./85% relative humidity. The developers were charged in a Turbula mixer for 60 minutes.

The toner charge was measured in the form of Q/D, the charge to diameter ratio. The Q/D was measured using a charge spectrograph having a 100 V/cm field, and was measured visually as the midpoint of the toner charge distribution. The charge was reported in millimeters of displacement from the zero line (mm displacement can be converted to femtocoulombs/micron (fC/μm) by multiplying by 0.092).

The toner charge was also measured as the charge per mass ratio (Q/M) as determined by the total blow-off charge method, measuring the charge on a faraday cage containing the developer after removing the toner by blow-off in a stream of air. The total charge collected in the cage is divided by the mass of toner removed by the blow-off, by weighing the cage before and after blow-off to give the Q/M ratio.

Toner Charge Maintenance. The developer sample (toner, additives, carrier) was conditioned in an A-zone environment of 28° C./85% RH for three days to equilibrate fully. The developer was charged by agitating the sample for two minutes in a Turbula mixer. The charge per unit mass of the sample was measured using a tribo charge blow-off method as described above. The developer sample was then returned to the A-zone chamber in an idle position. The charge per unit mass measurement was repeated again after 24 hours and 7 days. Charge maintenance was calculated from the 24 h and 7-day charge as a percentage of the initial charge.

Toner Blocking. Toner blocking was determined by measuring the toner cohesion at an elevated temperature above room temperature. The toner blocking measurement was completed as follows: two grams of developer sample was weighed into an open dish and conditioned in an environmental chamber at the specified elevated temperature and 50% relative humidity. After about 17 hours the developer samples were removed and acclimated in ambient conditions for about 30 minutes. Each re-acclimated developer sample was measured by sieving through a stack of two pre-weighed mesh sieves, which were stacked as follows: 1000 μm on top and 106 μm on bottom. The sieves are vibrated for about 90 seconds at about 1 mm amplitude with a Hosokawa flow tester. After the vibration was completed, the sieves were reweighed and toner blocking is calculated from the total amount of toner remaining on both sieves as a percentage of the starting weight. Thus, for a 2-gram developer sample, if A is the weight of developer left on the top 1000 μm screen and B is the weight of developer left on the bottom 106 μm screen, the toner blocking percentage is calculated by: % blocking=50 (A+B). The onset blocking temperature was also determined, which is defined as the temperature at which the measured toner cohesion begins to rapidly increase with temperature.

TABLE 1

Charging, Blocking and Cohesion Results.

| | A-zone | | J-zone | | RH ratio | | Charge Maintenance | | Blocking Onset Temp. | |
|---|---|---|---|---|---|---|---|---|---|---|
| | Az Q/d | Az Q/m | Jz Q/d | Jz Q/m | add RH Q/d | add RH Q/m | 24 h CM | 7 d CM | (° C.) | Cohesion |
| Toner with Organic Additive of Comparative Example 1 | 5.8 | 33 | 10.4 | 59 | 0.55 | 0.56 | 95 | 83 | 50.0 | 41 |
| Toner with Organic Additive of Example 1 | 6.0 | 31 | 10.9 | 54 | 0.55 | 0.57 | 95 | 85 | 51.3 | 65 |

As shown in Table 1, above, the charging performance for the toner comprising the organic additive of Example 1 was nearly identical to that using the organic additive of Comparative Example 1. However, the blocking performance was significantly improved by 1.3° C. for the toner comprising the organic additive of Example 1. This is particularly surprising given the similarity in chemical structure of glycerol formal methacrylate to that of cyclohexyl methacrylate and the relatively small amount of glycerol formal methacrylate used as compared to cyclohexyl methacrylate.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A composition comprising a plurality of organic additive particles, the particles comprising a polymerization product of reactants comprising a dioxane/dioxolane monomer and a vinyl co-monomer, wherein the dioxane/dioxolane monomer is selected from a group consisting of glycerol formal (meth)acrylate, trimethylolpropane formal (meth)acrylate, isopropylideneglycerol (meth)acrylate, and combinations thereof, and the vinyl co-monomer is cyclohexyl methacrylate, and further wherein the particles have a $D_{50}$ particle size in a range of from about 20 nm to about 500 nm, and further wherein the composition is in the form of a dry powder.

2. The composition of claim 1, wherein the dioxane/dioxolane monomer is glycerol formal (meth)acrylate.

3. The composition of claim 1, wherein the dioxane/dioxolane monomer is present at an amount of from about 1 to about 50 weight percent of a total weight of monomers in the particles and the vinyl co-monomer is present at an amount of up to about 85 weight percent of the total weight of monomers in the particles.

4. The composition of claim 1, the reactants further comprising a multifunctional vinyl monomer, and an additional vinyl monomer selected from a group consisting of fluorinated vinyl monomers, vinyl monomers comprising a nitrogen-containing group, and combinations thereof.

5. A toner composition comprising:
toner particles;
a colorant;
a plurality of organic additive particles, the organic additive particles comprising a polymerization product of reactants comprising a dioxane/dioxolane monomer, a vinyl co-monomer, a multifunctional vinyl monomer, and an additional vinyl monomer selected from a group consisting of fluorinated vinyl monomers, vinyl monomers comprising a nitrogen-containing group, and combinations thereof, wherein the dioxane/dioxolane monomer is selected from a group consisting of glycerol formal (meth)acrylate, trimethylolpropane formal (meth)acrylate, isopropylideneglycerol (meth)acrylate, and combinations thereof, and the vinyl co-monomer is cyclohexyl methacrylate; and
optionally, a wax,
wherein the organic additive particles have a $D_{50}$ particle size in a range of from about 20 nm to about 500 nm, and further wherein the toner composition is in the form of a dry powder.

6. An additive manufacturing composition comprising a polymeric material, a metal material, or a combination thereof; and a plurality of organic additive particles, the particles comprising a polymerization product of reactants comprising a dioxane/dioxolane monomer and vinyl co-monomer, wherein the dioxane/dioxolane monomer is selected from a group consisting of glycerol formal (meth)acrylate, trimethylolpropane formal (meth)acrylate, isopropylideneglycerol (meth)acrylate, and combinations thereof, and the vinyl co-monomer is cyclohexyl methacrylate, wherein the organic additive particles have a $D_{50}$ particle size in a range of from about 20 nm to about 500 nm, and further wherein the additive manufacturing composition is in the form of a dry powder.

7. A composition comprising a plurality of organic additive particles, the organic additive particles comprising a polymerization product of reactants comprising a dioxane/dioxolane monomer and a vinyl co-monomer, wherein the reactants comprise glycerol formal (meth)acrylate as the dioxane/dioxolane monomer, an aliphatic cyclo(meth)acrylate as the vinyl co-monomer, a multifunctional vinyl monomer, a monofunctional vinyl monomer comprising a nitrogen-containing group, and an initiator and further wherein the particles have a $D_{50}$ particle size in a range of from about 20 nm to about 500 nm, and further wherein the composition is in the form of a dry powder.

8. The composition of claim 7, wherein the glycerol formal (meth)acrylate is present at an amount of from about 10 to about 30 weight percent of a total weight of monomers in the particles; the aliphatic cyclo(meth)acrylate is present at an amount of from about 50 to about 99 weight percent of the total weight of monomers in the particles; the multifunctional vinyl monomer is present at an amount of from about 8 to about 40 weight percent of the total weight of monomers in the particles; and the monofunctional vinyl monomer comprising the nitrogen-containing group is present at an amount of from about 0.1 to about 1.5 weight percent of the total weight of monomers in the particles.

9. The composition of claim 8, wherein the particles consist of the polymerization product of the reactants and the reactants consist of the glycerol formal (meth)acrylate, the aliphatic cyclo(meth)acrylate, the multifunctional vinyl monomer, the monofunctional vinyl monomer comprising the nitrogen-containing group, and the initiator.

10. The composition of claim 9, wherein the aliphatic cyclo(meth)acrylate is cyclohexyl methacrylate, the multifunctional vinyl monomer is divinylbenzene, and the monofunctional vinyl monomer comprising the nitrogen-containing group is dimethylaminoethyl methacrylate.

11. The toner composition of claim 5, wherein the dioxane/dioxolane monomer is glycerol formal (meth)acrylate.

12. The additive manufacturing composition of claim 6, wherein the dioxane/dioxolane monomer is glycerol formal (meth)acrylate.

* * * * *